US010995817B2

(12) United States Patent
Yamazumi et al.

(10) Patent No.: US 10,995,817 B2
(45) Date of Patent: May 4, 2021

(54) FLYWHEEL APPARATUS

(71) Applicant: AISIN SEIKI KABUSHIKI KAISHA, Kariya (JP)

(72) Inventors: Atsushi Yamazumi, Kariya (JP); Yasuyuki Imai, Toyota (JP); Tsuneo Ukei, Toyoake (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 394 days.

(21) Appl. No.: 16/013,423

(22) Filed: Jun. 20, 2018

(65) Prior Publication Data

US 2018/0372181 A1 Dec. 27, 2018

(30) Foreign Application Priority Data

Jun. 27, 2017 (JP) .............................. JP2017-125554

(51) Int. Cl.
*F16F 15/12* (2006.01)
*F16F 15/131* (2006.01)
*F16F 15/123* (2006.01)
*F16F 15/129* (2006.01)

(52) U.S. Cl.
CPC ........ *F16F 15/1203* (2013.01); *F16F 15/123* (2013.01); *F16F 15/1207* (2013.01);
(Continued)

(58) Field of Classification Search
CPC .. F16F 15/1203; F16F 15/123; F16F 15/1315; F16F 15/12306; F16F 15/1207;
(Continued)

(56) References Cited

U.S. PATENT DOCUMENTS 2,090,264 A * 8/1937 Padgett ................... F16D 43/08
464/68.2
4,871,342 A * 10/1989 Boss ....................... B60K 17/02
(Continued)

FOREIGN PATENT DOCUMENTS

BE 646587 * 7/1964 ................ 403/244
CH 467 044 * 2/1969 ................ 403/244
(Continued)

OTHER PUBLICATIONS

Office Action (Notice of Reasons for Refusal) dated Jan. 26, 2021, by the Japanese Patent Office in rresponding Japanese Patent Application No. 2017-125554 and an English Translation of the Office Action. (6 pages).

*Primary Examiner* — Greg Binda
(74) *Attorney, Agent, or Firm* — Buchanan Ingersoll & Rooney PC (57) ABSTRACT

A flywheel apparatus includes a damper, and a mass ring including a first surface facing a first side in an axial direction, a second surface facing a second side and a first circumferential surface facing an inner side in a radial direction. The apparatus includes a drive plate including a first wall portion including a third surface being in contact with the second surface, and a plurality of protruding portions, each of the plurality of protruding portions including an end surface configured to fit to the first circumferential surface. The drive plate is configured such that the mass ring is concentrically attachable to the drive plate by the fitting of the end surfaces and the first circumferential surface to each other.

6 Claims, 5 Drawing Sheets

(52) U.S. Cl.
CPC .... *F16F 15/12306* (2013.01); *F16F 15/1315* (2013.01); *F16F 15/1292* (2013.01); *F16F 2236/04* (2013.01); *F16F 2238/026* (2013.01); *Y10T 74/2132* (2015.01)

(58) Field of Classification Search
CPC ............. F16F 15/1292; F16F 2238/026; F16F 2236/04; Y10T 74/2132
USPC .................................. 464/46, 68.1; 403/244
See application file for complete search history.

(56) References Cited

U.S. PATENT DOCUMENTS

| | | | | |
|---|---|---|---|---|
| 5,465,635 | A | * | 11/1995 | Kono ..................... F16D 13/70 464/68.1 |
| 6,014,912 | A | * | 1/2000 | Carlson ............. F16F 15/13114 464/68.1 |
| 6,763,743 | B2 | | 7/2004 | Watanabe et al. |
| 8,371,948 | B2 | | 2/2013 | Usui et al. |
| 2001/0020564 | A1 | | 9/2001 | Fukushima |
| 2016/0169358 | A1 | | 6/2016 | Kawahara et al. |

FOREIGN PATENT DOCUMENTS

| | | |
|---|---|---|
| JP | 2001-254805 A | 9/2001 |
| JP | 2002-340092 A | 11/2002 |
| JP | 2011-208748 A | 10/2011 |
| JP | 5389714 B2 | 1/2014 |
| JP | 2014-126131 A | 7/2014 |
| JP | 2015-001234 A | 1/2015 |
| JP | 2015-017671 A | 1/2015 |

* cited by examiner

FLYWHEEL APPARATUS

CROSS REFERENCE TO RELATED APPLICATIONS

This application is based on and claims priority under 35 U.S.C. § 119 to Japanese Patent Application 2017-125554, filed on Jun. 27, 2017, the entire content of which is incorporated herein by reference.

TECHNICAL FIELD

This disclosure generally relates to a flywheel apparatus.

BACKGROUND DISCUSSION

A known flywheel apparatus includes a mass ring including a first surface facing one side in an axial direction and fixed to a damper, and a second surface facing the other side in the axial direction and provided with a recessed portion. The known flywheel apparatus also includes a drive plate which includes an outer circumferential portion that can be fitted to the recessed portion, and the mass ring can be concentrically attachable to the drive plate by the fitting of the outer circumferential portion into the recessed portion.

According to the known flywheel apparatus disclosed in JP2015-1234A (which will be hereinafter referred to as Patent reference 1), the recessed portion needs to be provided at the second surface of the mass ring, and accordingly a cutting process of the mass ring is increased and a machining accuracy of the recessed portion at the cutting process needs to be assured. Consequently, workload and/or costs needed for manufacturing the flywheel apparatus may increase.

A need thus exists for a flywheel apparatus which is not susceptible to the drawback mentioned above.

SUMMARY

According to an aspect of this disclosure, a flywheel apparatus includes a damper being rotatable about a rotary center and relaxing torque fluctuation. The flywheel apparatus includes a mass ring including a first surface facing a first side in an axial direction of the rotary center, the first surface being fixed to the damper, a second surface facing a second side in the axial direction, and a first circumferential surface facing an inner side in a radial direction of the rotary center or an outer side in the radial direction. The flywheel apparatus includes a drive plate including a first wall portion including a third surface being in contact with the second surface, the first wall portion being fixed to the mass ring and plural protruding portions positioned at the first side in the axial direction relative to the third surface and extended from the first wall portion along the radial direction, each of the plurality of protruding portions including an end surface configured to fit to the first circumferential surface. The drive plate is configured such that the mass ring is concentrically attachable to the drive plate by the fitting of the end surfaces and the first circumferential surface to each other.

According to another aspect of this disclosure, a flywheel apparatus includes a damper being rotatable about a rotary center and relaxing torque fluctuation. The flywheel apparatus includes a mass ring including a first surface facing a first side in an axial direction of the rotary center, the first surface being connected to the damper, a second surface facing a second side in the axial direction, and a first circumferential surface facing an inner side in a radial direction of the rotary center or an outer side in the radial direction. The flywheel apparatus includes a drive plate including a first wall portion including a third surface being in contact with the second surface, the mass ring being fixed to the first wall portion via the third surface, and plural protruding portions positioned at the first side in the axial direction relative to the third surface and extended from the first wall portion along the radial direction, each of the plurality of protruding portions including an end surface being in contact with the first circumferential surface. The mass ring is concentrically provided at the drive plate by the contact of the end surfaces and the first circumferential surface with each other.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Exemplary and schematic embodiments of the disclosure will be explained hereunder. Configurations of the embodiments, and operations and effects which are brought by such configurations are examples.

The embodiments disclosed hereunder include similar structure components. Thus, the similar structure components are designated by common reference numbers and duplicate explanation will be omitted. In the description, ordinal numbers are used only to distinguish parts and/or members, and are not used to indicate an order and/or a degree of relative priority.

Figure 1:
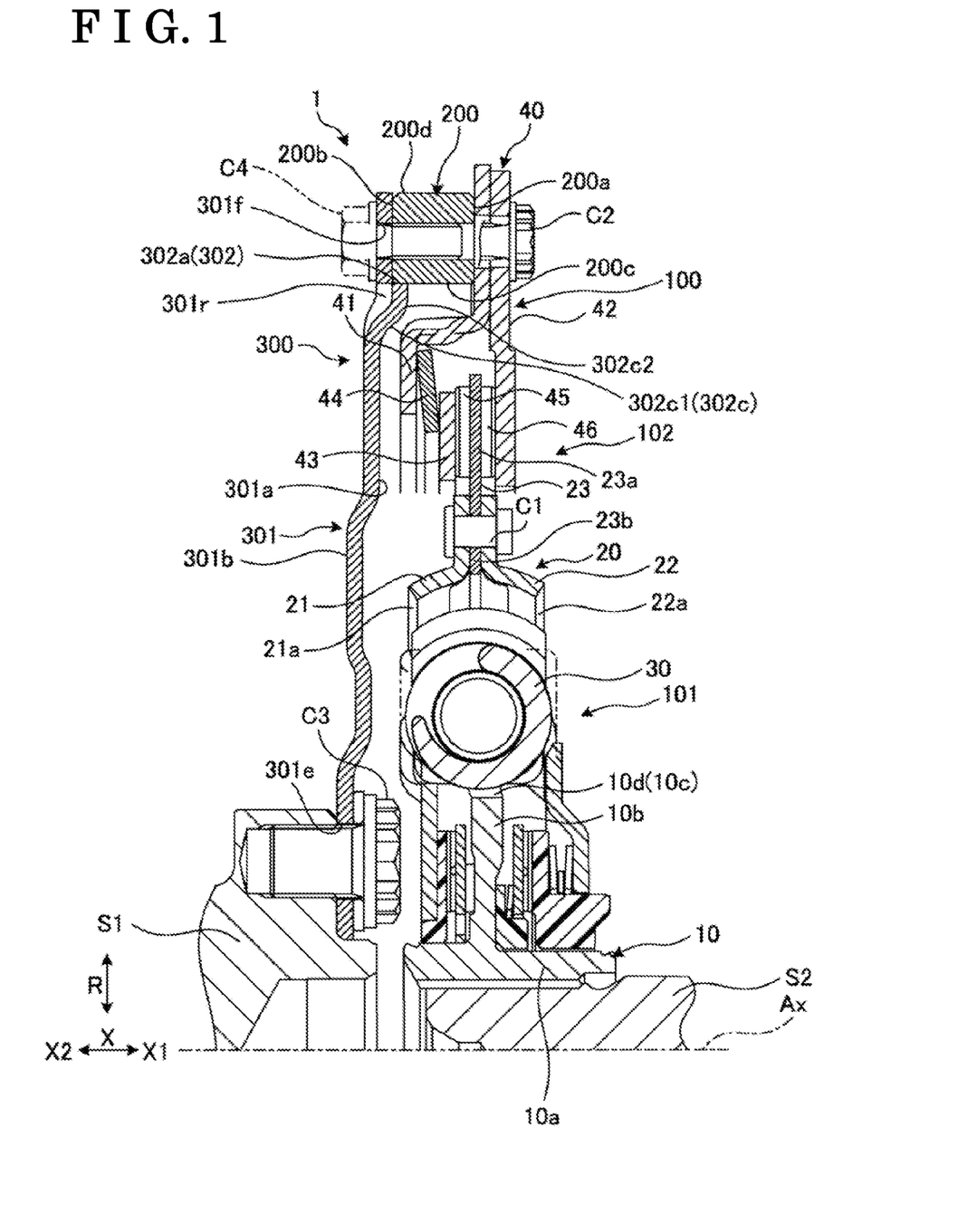
FIG. 1 is an exemplary and schematic cross-sectional view illustrating a flywheel apparatus of a first embodiment disclosed here, which is taken along line I-I in FIG. 2 and FIG. 3.

A first embodiment will be explained. As illustrated in FIG. 1, a flywheel apparatus 1 includes a damper 100, a mass ring 200 and a drive plate 300, for example. The drive plate 300 is connected to an output shaft S1 of an engine and the damper 100 is connected to an input shaft S2 of a transmission. The mass ring 200 is interposed between the drive plate 300 and the damper 100. The flywheel apparatus 1 is configured to relax or reduce fluctuations of drive force, including torque and/or rotations, between the engine corresponding to an input side and the transmission corresponding to an output side, by way of the damper 100 and/or the mass ring 200, for example.

In the explanation below, the directions are defined for convenience as illustrated in the drawings. A direction X is along an axial direction of a rotary center Ax of the flywheel apparatus 1. A direction R is along a radial direction of the rotary center Ax. A direction C is along a circumferential direction of the rotary center Ax. In the explanation below, a side of the transmission (the right side) in FIG. 1 will be referred to as a direction X1 and a side of the engine (the left side) in FIG. 1 will be referred to as a direction X2, for the purpose of convenience. The direction X1 is an example of a first side in the axial direction and the direction X2 is an example of a second side in the axial direction.

Figure 2:
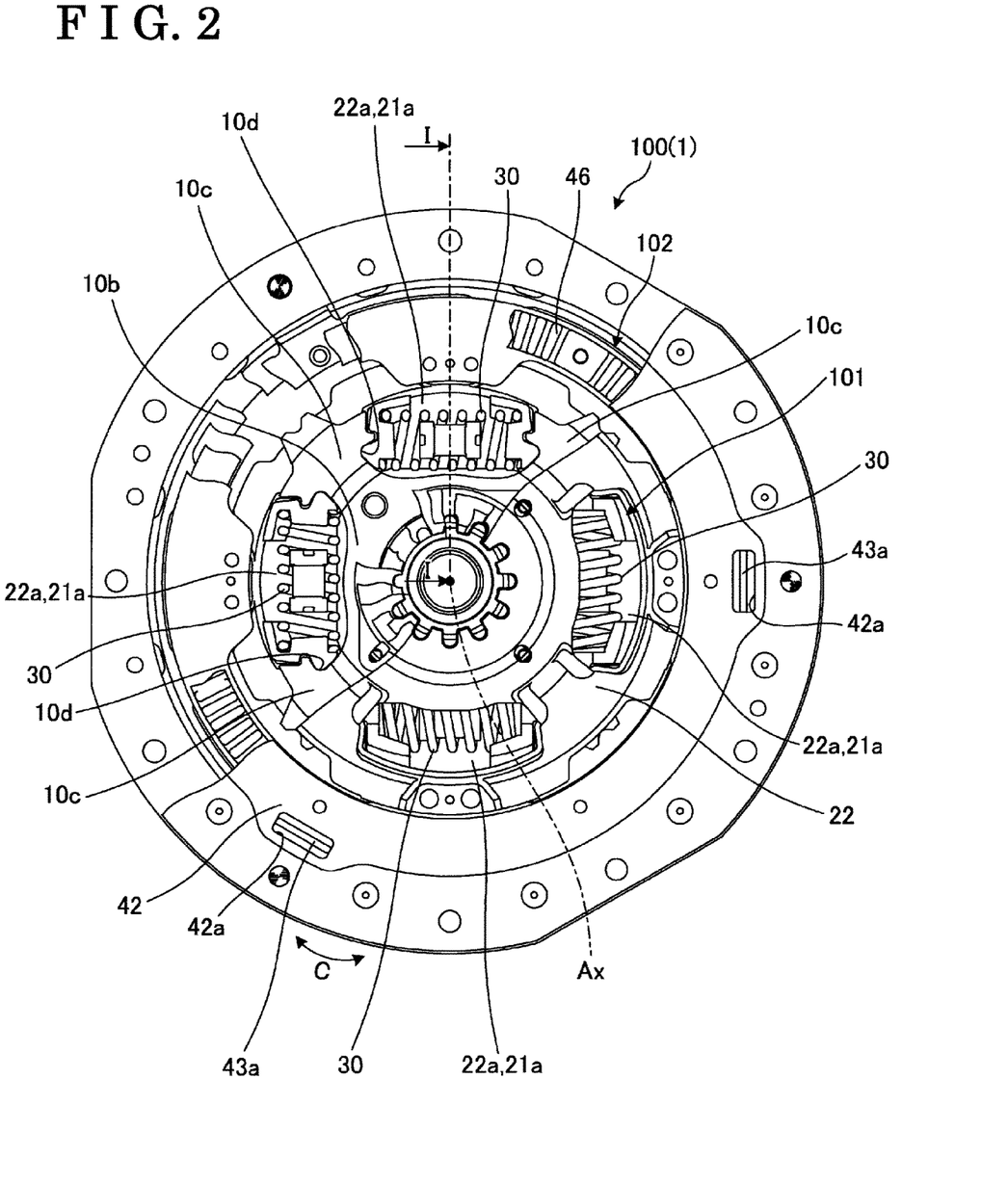
FIG. 2 is an exemplary and schematic front view of a damper of the flywheel apparatus disclosed here.

As illustrated in FIGS. 1 and 2, the damper 100 is configured to include a flattened disk shape which is thin in the axial direction as a whole. The damper 100 is rotatable about the rotary center Ax. The damper 100 includes a damper portion 101 and a limiter portion 102, for example. The damper portion 101 is positioned radially inward relative to the limiter portion 102.

The damper portion 101 includes a center plate 10, a side plate 20 and a coil spring 30, for example. The center plate 10 is an example of a first rotary element and the side plate 20 is an example of a second rotary element. The coil spring 30 is an example of a first resilient element.

As illustrated in FIG. 1, for example, the center plate 10 incudes a hub 10a formed in a cylindrical shape and a flange plate 10b projecting radially outward from the hub 10a. The center plate 10 may be referred to also as an inner plate, a hub plate and a hub member, for example.

The hub 10a is provided to surround the input shaft S2 of the transmission. For example, the hub 10a is connected to the input shaft S2 of the transmission by way of spline fitting, and thus the hub 10a rotates integrally with the input shaft S2.

The flange plate 10b is configured to include a substantially annular plate shape extended and spread in the radial direction. The flange plate 10b is positioned radially inward relative to the coil spring 30.

The center plate 10 includes four arms 10c each extended radially outward from the flange plate 10b. As illustrated in FIG. 2, the arm 10c is extended from the hub 10a towards the outer side in the radial direction and passes through the two coil springs 30 that are arranged adjacent to each other. In other words, the four arms 10c are arranged around the rotary center Ax to be spaced away from one another by 90 degrees. A gap 10d is provided between the two arms 10c which are next to each other in the circumferential direction, and the coil spring 30 is accommodated in each of the gaps 10d. The number of the arms 10c is not limited to four.

As illustrated in FIG. 1, the side plate 20 includes a first side plate 21, a second side plate 22 and a lining plate 23, for example. The second side plate 22 is positioned in the direction X1 relative to the first side plate 21. The lining plate 23 is positioned between the first side plate 21 and the second side plate 22.

Each of the first side plate 21 and the second side plate 22 is configured to include an annular plate shape extended and spread in the radial direction. Radially inward portions of the first side plate 21 and the second side plate 22, respectively, are arranged spaced away from each other in the axial direction, and radially outward portions of the first side plate 21 and the second side plate 22, respectively, are connected to each other with a connector C1 including, for example, a rivet as illustrated in FIG. 1.

As illustrated in FIGS. 1 and 2, the first side plate 21 and the second side plate 22 are provided with opening portions 21a and 22a, respectively. The opening portions 21a and 22a are provided at positions corresponding to the gaps 10d. In other words, the opening portions 21a, 22a, and the gaps 10d are arranged in the axial direction. Each of the coil springs 30 is provided in the opening portions 21a, 22a in a manner that the coil spring 30 is disposed from one circumferential edge portions of the opening portions 21a, 22a over to the other circumferential edge portions of the opening portions 21a, 22a.

As illustrated in FIG. 1, the lining plate 23 includes an annular portion 23a and an inward flange 23b protruding radially inward from the annular portion 23a. The annular portion 23a is arranged to be sandwiched between a first friction member 45 of the limiter portion 102 and a second friction member 46 of the limiter portion 102. The inward flange 23b, the first side plate 21 and the second side plate 22 are connected to one another with the connector C1 including the rivet. Thus, the lining plate 23 rotates about the rotary center Ax integrally with the first side plate 21 and the second side plate 22.

As illustrated in FIG. 2, the coil spring 30 is accommodated in the gap 10d and the opening portions 21a and 22a which are overlapped with one another in the axial direction. In the above-described configuration, when the relative rotation occurs in a direction in which one circumferential edge portion of the gap 10d at one circumferential side (that is, the arm 10c) and the other circumferential edge portions of the opening portions 21a, 22a at the other circumferential edge portion come close to each other, the coil spring 30 is resiliently contracted or compressed by the circumferential edge portions. To the contrary, in the state in which the coil spring 30 is resiliently contracted inside the gap 10d and the opening portions 21a, 22a, when the relative rotation occurs in a direction in which the one circumferential edge portion of the gap 10d (that is, the arm 10c) and the other circumferential edge portions of the opening portions 21a, 22a become away from each other, the coil spring 30 is resiliently expanded.

As explained above, the coil spring 30 is arranged to be positioned between the center plate 10 and the side plate 20, and the coil spring 30 is contracted and expanded in the resilient manner when the center plate 10 and the side plate 20 rotate relative to each other. The coil spring 30 stores the torque as a compressive force by being resiliently compressed, and releases the compressive force as the torque by resiliently expanding. Due to the contraction and expansion of the coil springs 30, the damper portion 101 is configured to relax or alleviate the torque fluctuation. The relative rotation of the center plate 10 and the side plate 20 relative to each other is limited within a predetermined angle range by stoppers that come in contact with each other. Thus, the coil spring 30 is restricted from being contracted excessively.

The limiter portion 102 is arranged radially outward relative to the damper portion 101. For example, the limiter portion 102 includes a cover plate 41, a leaf spring 44, a pressure plate 43, the first friction member 45, the lining plate 23, the second friction member 46 and a support plate 42, which are arranged from the left side to the right side in FIG. 1. The cover plate 41, the leaf spring 44, the pressure plate 43, the first friction member 45, the lining plate 23, the second friction member 46 and the support plate 42 are overlapped with one another in the axial direction in a state of being in close contact with one another.

A radially outward portion of the cover plate 41 and a radially outward portion of the support plate 42 are connected to each other with a connector C2 including, for example, a bolt, as illustrated in FIG. 1. As illustrated in FIG. 2, the pressure plate 43 is provided with a hook portion 43a which engages with or is hooked at, in the circumferential direction, an opening portion 42a provided at the support plate 42. Thus, the cover plate 41, the support plate 42 and the pressure plate 43 rotate integrally with one another about the rotary center Ax. The cover plate 41, the support plate 42 and the pressure plate 43 are an example of a third rotary element, and referred to also as an outer plate 40, for example.

In a state where a difference of the torque between the damper portion 101 and a side of the limiter portion 102 the side which is opposite to the damper portion 101 is smaller than a threshold value set within a set range, slippage is not generated at the limiter portion 102 because of a resilient pressing force of the leaf spring 44. Accordingly, the damper 100 including the damper portion 101 and the limiter portion 102 rotate integrally with each other. In other words, in a state in which the difference of the torque between the damper portion 101 and the side of the limiter portion 102 the side which is opposite to the damper portion 101 is greater than the threshold value, the slippage that is beyond a friction force generated by the resilient pressing force of the leaf spring 44 occurs at the limiter portion 102. As explained above, the limiter portion 102 functions as a torque limiter restricting an excessive torque exceeding the set value from being transmitted.

The mass ring 200 is configured to include an annular shape. As illustrated in FIG. 1, the mass ring 200 includes a surface 200a facing the direction X1 and a surface 200b facing the direction X2. The surface 200a faces the cover plate 41. The surface 200a is connected, with the connector C2, to the cover plate 41 and the support plate 42 (to be integrated with one another). The surface 200a is an example of a first surface and the surface 200b is an example of a second surface.

The mass ring 200 includes an inner circumferential surface 200c facing an inner side in the radial direction and an outer circumferential surface 200d facing an outer side in the radial direction. In the embodiment, it is configured such that the mass ring 200 can be concentrically attached to the drive plate 300 by way of fitting of the inner circumferential surface 200c and a protruding portion 302 of the drive plate 300 to each other or by way of the surface contact, in the radial direction, of the inner circumferential surface 200c and the protruding portion 302 of the drive plate 300 with each other. The protruding portion 302 will be described below. The inner circumferential surface 200c is an example of a first circumferential surface.

Figure 3:
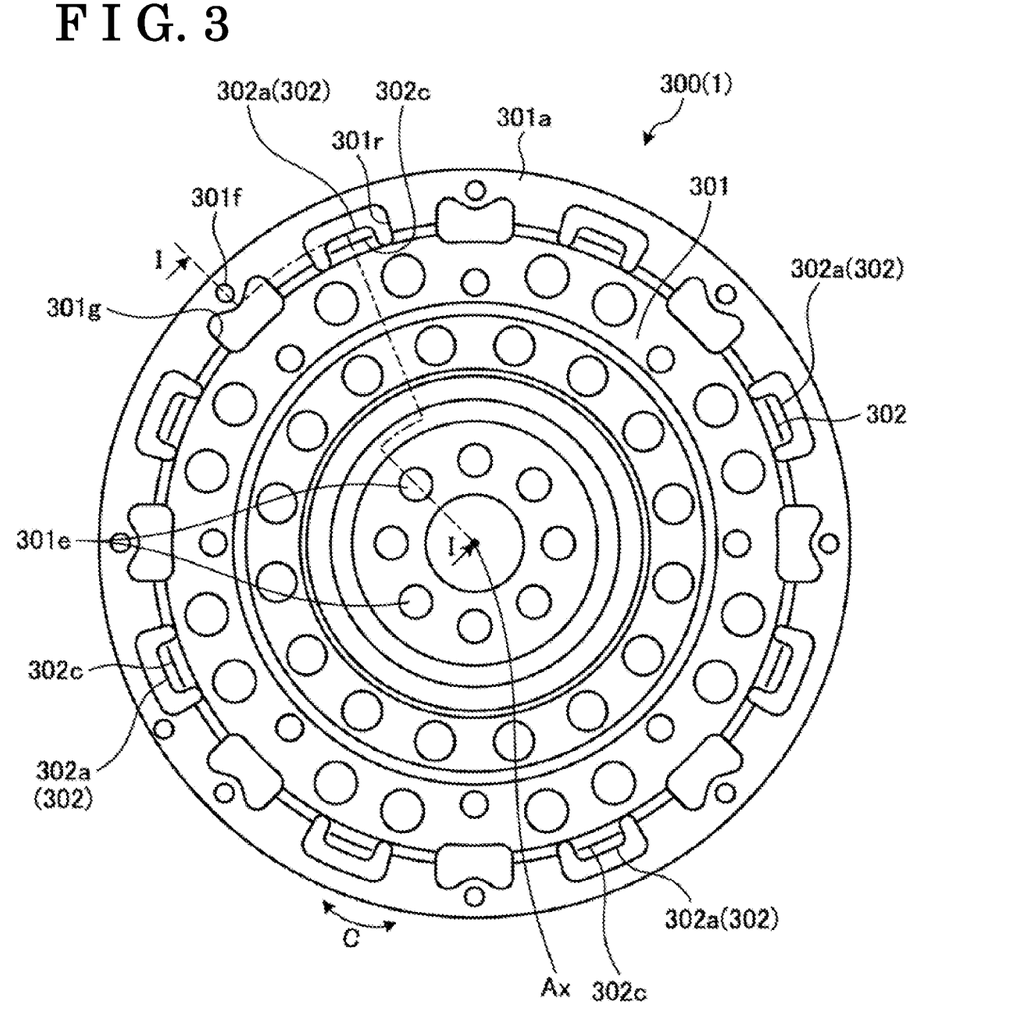
FIG. 3 is an exemplary and schematic front view of a drive plate the flywheel apparatus disclosed here.

As illustrated in FIGS. 1 and 3, the drive plate 300 includes a wall portion 301 and plural of protruding portions 302, for example. The wall portion 301 is configured to include an annular plate shape extending in the radial direction. The wall portion 301 includes a surface 301a facing the direction X1 and a surface 301b facing the direction X2. A radially outward portion of the surface 301a is in contact with the mass ring 200. The wall portion 301 is an example of a first wall portion and the surface 301a is an example of a third surface.

A radially inward portion of the wall portion 301 is provided with plural opening portions 301e each penetrating the surface 301a and the surface 301b. As illustrated in FIG. 1, the drive plate 300 is connected, with a connector C3, to the output shaft S1 of the engine (to be integrated with each other). The connector C3 includes, for example, a bolt penetrating the opening portion 301e. The drive plate 300 is concentrically attached to the output shaft S1.

As illustrated in FIG. 3, a radially outward portion of the wall portion 301 is provided with plural opening portions 301f, 301g, 301r each penetrating the surface 301a and the surface 301b. Each of the opening portions 301g and the opening portions 301r is an elongated hole extended in the circumferential direction. In the embodiment, the plural opening portions 301g and the plural opening portions 301r are arranged in the circumferential direction in a manner that the opening portion 301g and the opening portion 301r alternate with each other with a space provided therebetween.

The opening portions 301f are provided to be close to a radially outward side relative to the opening portions 301g. As illustrated in FIG. 1, the drive plate 300 is connected, with a connector C4, to the mass ring 200 (to be integrated with each other). The connector C4 includes, for example, a bolt penetrating the opening portion 301f. Each of the opening portions 301g may function as a hole for releasing stress that is concentrated around the corresponding opening portion 301f due to the tightening of the connector C4. As illustrated in FIGS. 1 to 3, the connectors C2 and the connectors C4 are positioned to be offset relative to each other in the circumferential direction.

As illustrated in FIG. 3, each of the plural protruding portions 302 is provided at a radially inward edge portion of the corresponding opening portion 301r. The protruding portion 302 is formed to protrude, from the wall portion 301, in the direction X1 (refer to FIG. 1) and towards the outer side in the radial direction. The protruding portion 302 is positioned towards the direction X1 (i.e., the first side) relative to the surface 301a. For example, the protruding portion 302 is formed by a cutting-and-raising processing such that the protruding portion 302 is cut from the wall portion 301 and raised to be apart from or spaced away from the wall portion 301 in the axial direction. The opening portion 301r is an example of a first opening portion.

Each of the protruding portions 302 includes an end surface 302a facing the outer side in the radial direction. The end surface 302a faces the inner circumferential surface 200c of the mass ring 200. The end surface 302a is extended along the inner circumferential surface 200c in the circumferential direction. For example, after the protruding portion 302 is formed by being cut and raised, lathe machining may be performed so that the end surface 302a is configured to include a curved surface configuration in which the rotary center Ax is a center of the curved surface.

Each of the protruding portions 302 includes a curved portion 302c. The curved portion 302c is curved or bent such that the curved portion 302c includes a crank shape when viewed in a line of sight which is orthogonal to the axial direction, that is, when viewed in the line of sight in which FIG. 1 is viewed. That is, the curved portion 302c includes an inclined portion 302c1 and an extended portion 302c2. The inclined portion 302c1 is curved or bent from the radially inward edge portion of the opening portion 301r towards the right side in FIG. 1 (that is, towards the damper 100), in such a manner that the inclined portion 302c1 goes towards the radially outer side as the inclined portion 302c1 goes towards the right side. The extended portion 302c2 is bent towards the outer side in the radial direction from the inclined portion 302c1 and is extended towards the outer side in the radial direction.

In the embodiment, for example, it is configured such that the inner circumferential surface 200c and the end surfaces 302a are fitted to each other or are in surface contact in the radial direction with each other, in a state where the curved portions 302c are resiliently deformed towards the inner side in the radial direction. Thus, dimensional errors (manufacturing variations) of the inner circumferential surface 200c and the end surfaces 302a are absorbed, and consequently the mass ring 200 is attached to the drive plate 300 in a manner that the mass ring 200 is concentric with the drive plate 300 with more accuracy.

As described above, according to the embodiment, the mass ring 200 can be concentrically attached to the drive plate 300 by way of the plural protruding portions 302. Consequently, a centering operation of the output shaft S1 of the engine and the input shaft S2 of the transmission with each other can be performed via the mass ring 200 more easily or simply.

For example, as described above, according to the embodiment, the flywheel apparatus 1 is provided with the drive plate 300 including the wall portion 301 including the surface 301a that is in contact with the surface 200b, and the wall portion 301 is fixed to the mass ring 200. The drive plate 300 includes the plural protruding portions 302 positioned towards the direction X1 relative to the surface 301a and extended from the wall portion 301 along the radial direction. Each of the protruding portions 302 includes the end surface 302a that can fit to the inner circumferential surface 200c. The mass ring 200 can be concentrically attached to the drive plate 300 by the fitting or the surface contact of the end surfaces 302a and the inner circumferential surface 200c to each other. According to the above-described configuration, by utilizing the fitting of the inner circumferential surface 200c of the mass ring 200 and the plural protruding portions 302 of the drive plate 300, the mass ring 200 is attached to the drive plate 300 in the concentric manner. Thus, for example, a cutting process for the surface 200b of the mass ring 200 can be eliminated, and therefore workload and/or costs needed to manufacture the flywheel apparatus 1 is reduced more easily compared to a known case.

In the embodiment, for example, the protruding portions 302 are provided in a state of being cut and raised from the wall portion 301. According to the configuration in which the protruding portions 302 are cut and raised from the wall portion 301, the protruding portions 302 are formed and provided relatively easily in a simple manner, and therefore the workload and/or costs needed to manufacture the flywheel apparatus 1 is reduced more easily.

In the embodiment, for example, the drive plate 300 is provided with the opening portions 301r penetrating the wall portion 301, and the protruding portion 302 is provided so as to extend from the edge portion of each opening portion 301r. According to the configuration, for example, the protruding portion 302 can be formed even more easily due to a space portion provided inside the opening portion 301r.

In the embodiment, for example, the protruding portion 302 includes the curved portion 302c that is curved or bent when seen in the line of sight which is orthogonal to the axial direction. According to the configuration, for example, the protruding portions 302 are resiliently deformed more easily due to the curved portions 302c, thereby reducing a force needed to fit or engage the plural protruding portions 302 and the mass ring 200 to or with each other. Consequently, the assembling work of the mass ring 200 and the plural protruding portions 302 on each other can be performed more easily.

Figure 4:
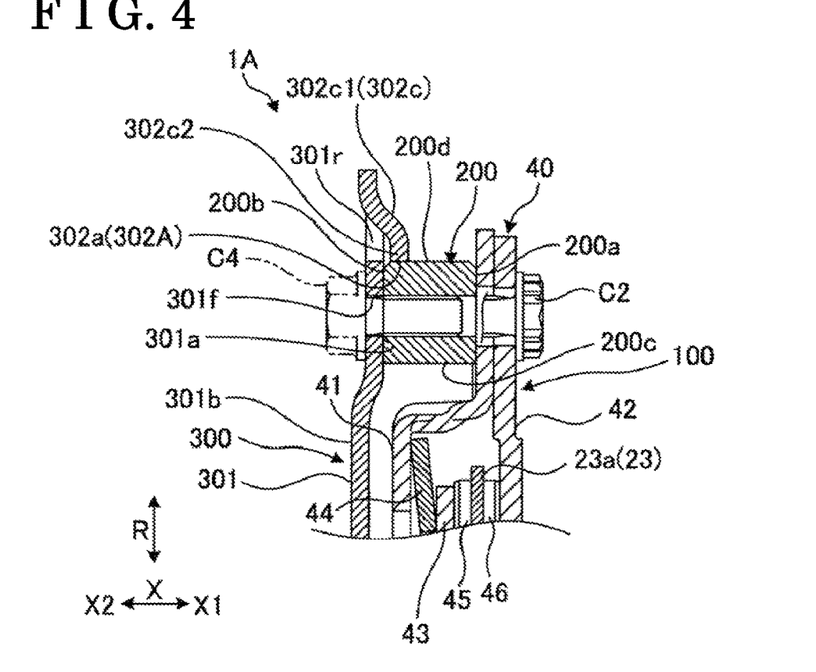
FIG. 4 is an exemplary and schematic cross-sectional view of a part of a flywheel apparatus of a second embodiment disclosed here.

A second embodiment will be explained. A flywheel apparatus 1A of the second embodiment which is illustrated in FIG. 4 includes a similar configuration to the flywheel apparatus 1 of the first embodiment. Therefore, according also to the second embodiment, the similar consequences (effects) based on the configuration similar to the first embodiment can be obtained.

As illustrated in FIG. 4, the second embodiment differs from the first embodiment in that the drive plate 300 includes plural protruding portions 302A which can fit to the outer circumferential surface 200d of the mass ring 200. In the second embodiment, a diameter of the wall portion 301 is set to be greater than a diameter of the mass ring 200. The protruding portions 302A and the opening portions 301r are provided at portions of the wall portion 301, the portions which are positioned radially outward relative to the mass ring 200. The protruding portion 320A is curved or bent to include a crank shape such that the protruding portion 302A is extended, from the wall portion 301, in the direction X1 and towards the inner side in the radial direction. The end surface 302a of the protruding portion 302A faces radially inward and faces the outer circumferential surface 200d of the mass ring 200. Thus, for example, according to the second embodiment, by utilizing the fitting of the outer circumferential surface 200d and the plural protruding portions 302A to each other, the mass ring 200 is attached to the drive plate 300 in the concentric manner. The outer circumferential surface 200d is an example of the first circumferential surface.

Figure 5:
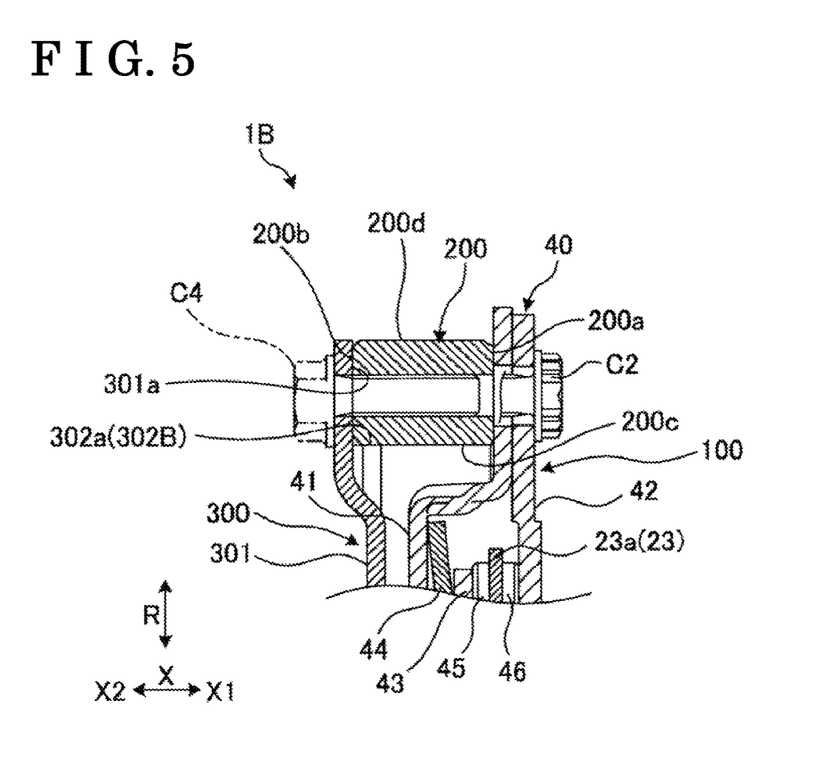
FIG. 5 is an exemplary and schematic cross-sectional view of a part of a flywheel apparatus of a third embodiment disclosed here.

A third embodiment will be explained. A flywheel apparatus 1B of the third embodiment which is illustrated in FIG. 5 includes a similar configuration to the flywheel apparatus 1 of the first embodiment. Therefore, according also to the third embodiment, the similar consequences (effects) based on the configuration similar to the first embodiment can be obtained.

As illustrated in FIG. 5, the third embodiment differs from the first embodiment in that each of plural protruding portions 302B is extended linearly along the radial direction. In the third embodiment, a radially outward portion of the wall portion 301 is bent or curved to include a crank shape so as to extend, from the wall portion 301, in the direction X2 and towards the outer side in the radial direction. For example, the wall portion 301 can be formed by a bending processing, that is, by being bent in the direction X2 as a whole while a radially inward edge portion of the corresponding opening portion 301r (illustrated in FIG. 3) serving as a base point. The protruding portion 302B is positioned towards the direction X1 relative to the surface 301a of the radially outward portion of the wall portion 301. Thus, for example, according to the third embodiment, by utilizing the fitting of the inner circumferential surface 200c and the plural protruding portions 302B, the mass ring 200 is attached concentrically to the drive plate 300.

Figure 6:
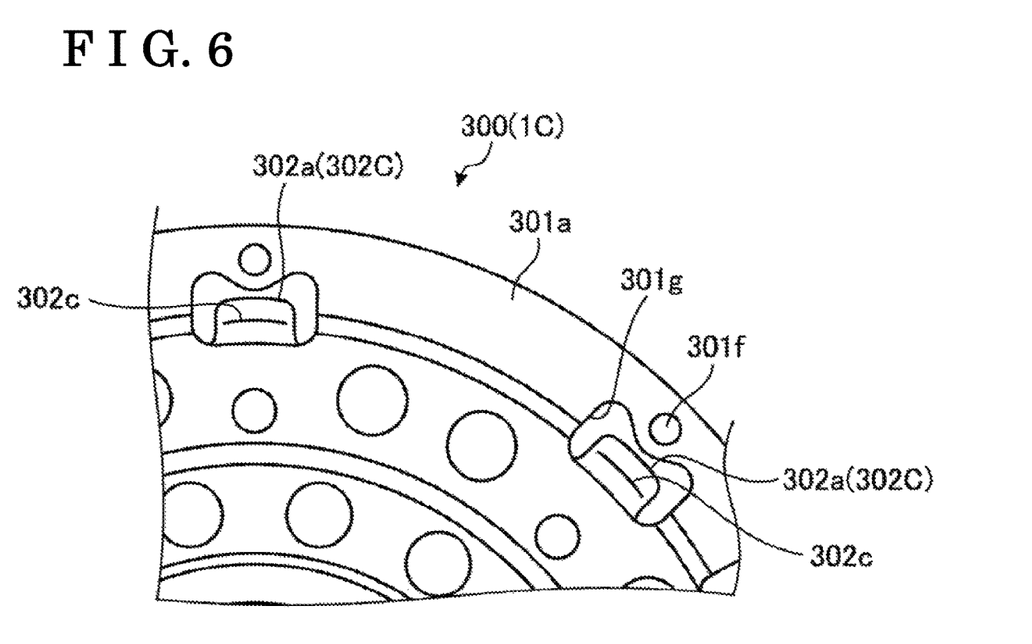
FIG. 6 is an exemplary and schematic cross-sectional view of a part of a flywheel apparatus of a fourth embodiment disclosed here.

A fourth embodiment will be explained. A flywheel apparatus 10 of the fourth embodiment which is illustrated in FIG. 6 includes a similar configuration to the flywheel apparatus 1 of the first embodiment. Therefore, according also to the fourth embodiment, the similar consequences (effects) based on the configuration similar to the first embodiment can be obtained.

As illustrated in FIG. 6, the fourth embodiment differs from the first embodiment in that a protruding portion 302C is provided at an edge portion of the opening portion 301g that is provided for releasing the stress. The opening portion 301g is an example of the first opening portion. Thus, according to the fourth embodiment, the protruding portion 302C can be provided by utilizing the opening portion 301g, for example. Accordingly, the drive plate 300 can be configured more easily, and the workload and/or costs needed to manufacture the flywheel apparatus 10 is reduced more easily.

The aforementioned embodiments are examples of the disclosure and are not intended to limit the scope of the disclosure. The aforementioned embodiments can be implemented in other various manners, and various omission, replacements, combinations and changes can be made without departing from the scope of the disclosure. The aforementioned embodiments are included in the scope and gist of the disclosure, and are included in a range of the disclosure described in the scope of claims and equivalents thereof. The disclosure can be implemented with a configuration other than the configurations disclosed in the aforementioned embodiments, and the various effects (including derivative effects) which are obtained from the basic configuration (technical feature) can be obtained from a configuration other than the configurations disclosed in the aforementioned embodiments. The specification of each of the structure components (structure, type, direction, shape, size, length, width, thickness, height, number, arrangement, position and material, for example) may be changed appropriately for the implementation.

According to the aforementioned embodiment, the flywheel apparatus 1, 1A, 1B, 10 includes the damper 100 that is rotatable about the rotary center Ax and that relaxes the torque fluctuation. The flywheel apparatus 1, 1A, 1B, 10 includes the mass ring 200 including the surface 200a (i.e., the first surface) facing the direction X1 (i.e., the first side) in the axial direction of the rotary center Ax, the surface 200a being fixed to the damper 100, the surface 200b (i.e., the second surface) facing the direction X2 (i.e., the second side) in the axial direction, and the inner or outer circumferential surface 200c, 200d (i.e., the first circumferential surface) facing the inner side in a radial direction of the rotary center (Ax) or the outer side in the radial direction. The flywheel apparatus 1, 1A, 1B, 10 includes the drive plate 300 including the wall portion 301 (i.e., the first wall portion) including the surface 301a (i.e., the third surface) which is in contact with the surface 200b, the wall portion 301 being fixed to the mass ring 200, and the plural protruding portions 302, 302A, 302B, 302C positioned towards the direction X1 in the axial direction relative to the surface 301a and extended from the wall portion 301 along the radial direction, each of the plural protruding portions 302, 302A, 302B, 302C including the end surface 302a configured to fit to the inner or outer circumferential surface 200c, 200d, and the drive plate 300 being configured such that the mass ring 200 is concentrically attachable to the drive plate 300 by the fitting of the end surfaces 302a and the inner or outer circumferential surface 200c, 200d to each other. According to the configuration, by utilizing the fitting of the inner or outer circumferential surface 200c, 200d of the mass ring 200 and the plural protruding portions 302, 302A, 302B, 302C of the drive plate 300, the mass ring 200 is attached to the drive plate 300 in the concentric manner. Thus, for example, the cutting process for cutting the surface 200b of the mass ring 200 can be omitted, and accordingly the workload and/or costs needed to manufacture the flywheel apparatus 1, 1A, 1B, 10 is reduced more easily compared to a known case.

According to the aforementioned embodiments, the protruding portions 302, 302A, 302B, 302C are provided in a state where the protruding portions 302, 302A, 302B, 302C are cut and raised from the wall portion 301. According to the configuration, for example, with the configuration in which the protruding portions 302, 302A, 302B, 302C are cut and raised from the wall portion 301, the protruding portions 302, 302A, 302B, 302C are formed and provided relatively easily, and therefore the workload and/or costs needed to manufacture the flywheel apparatus 1, 1A, 1B, 10 is reduced more easily.

According to the aforementioned embodiment, the drive plate 300 includes the opening portions 301g, 301r (i.e., the first opening portion) formed to penetrate the wall portion 301, and the protruding portions 302, 302C are provided at the edge portions of the respective opening portions 301g, 301r. According to the configuration, for example, the protruding portion 302, 302C can be provided even more easily due to the space portion provided inside the opening portion.

According to the aforementioned embodiment, the protruding portion 302, 302A includes the curved portion 302c which is curved when seen in a line of sight which is orthogonal to the axial direction. According to the configuration, for example, the protruding portion 302, 302A is resiliently deformed more easily due to the curved portion 302c, thereby reducing the force needed to fit the plural protruding portions 302 and the mass ring 200 to each other. Consequently, the fitting work of the mass ring 200 and the plural protruding portions 302, 302A on each other can be performed more easily.

According to the aforementioned embodiments, the flywheel apparatus 1, 1A, 1B, 10 includes the damper 100 being rotatable about the rotary center Ax and relaxing the torque fluctuation. The flywheel apparatus 1, 1A, 1B, 10 includes the mass ring 200 including the surface 200a (i.e., the first surface) facing the direction X1 (i.e., the first side) in the axial direction of the rotary center Ax, the surface 200a being connected to the damper 100, the surface 200b (i.e., the second surface) facing the direction X2 (i.e., the second side) in the axial direction, and the inner or outer circumferential surface 200c, 200d (i.e., the first circumferential surface) facing the inner side in the radial direction of the rotary center Ax or the outer side in the radial direction. The flywheel apparatus 1, 1A, 1B, 10 includes the drive plate 300 including the wall portion 301 (i.e., the first wall portion) including the surface 301a (i.e., the third surface) which is in contact with the surface 200b, the mass ring 200 being fixed to the wall portion 301 via the surface 301a, and the plural protruding portions 302, 302A, 302B, 302C positioned towards the direction X1 in the axial direction relative to the surface 301a and extended from the wall portion 301 along the radial direction, each of the plural protruding portions 302, 302A, 302B, 302C including the end surface 302a being in contact with the inner or outer circumferential surface 200c, 200d, and the mass ring 200 being configured to be concentrically provided at the drive plate 300 by the contact of the end surfaces 302a and the inner or outer circumferential surface 200c, 200d with each other. According to the configuration, by way of the contact of the inner or outer circumferential surface 200c, 200d of the mass ring 200 and the plural protruding portions 302, 302A, 302B, 302C of the drive plate 300 with each other, the mass ring 200 can be provided coaxially with the drive plate 300. Thus, for example, the cutting process for cutting the surface 200b of the mass ring 200 can be omitted, and accordingly the workload and/or costs needed to manufacture the flywheel apparatus 1, 1A, 1B, 10 is reduced more easily compared to a known case.

According to the aforementioned embodiments, the protruding portions 302, 302A, 302B, 302C are apart from the wall portion 301 in the axial direction. According to the configuration, for example, with the configuration in which the protruding portions 302, 302A, 302B, 302C are apart from the wall portion 301 in the axial direction, the protruding portions 302, 302A, 302B, 302C are formed and provided relatively easily, and therefore the workload and/or costs needed to manufacture the flywheel apparatus 1, 1A, 1B, 10 is reduced more easily.

According to the aforementioned embodiment, the drive plate 300 includes the opening portions 301g, 301r (i.e., the first opening portion) formed to penetrate the wall portion 301, and the protruding portions 302, 302C are provided to extend from the edge portions of the respective opening portions 301g, 301r. According to the configuration, for example, the protruding portion 302, 302C can be provided even more easily due to the space portion provided inside the opening portion.

According to the aforementioned embodiment, the protruding portion 302, 302A includes the curved portion 302c which is curved in a direction which is orthogonal to the axial direction. According to the configuration, for example, the protruding portion 302, 302A is resiliently deformed more easily due to the curved portion 302c, thereby reducing the force needed to fit or engage the plural protruding portions 302 and the mass ring 200 to or with each other. Consequently, the assembling work of the mass ring 200 and the plural protruding portions 302 on each other can be performed more easily.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A flywheel apparatus comprising:
a damper being rotatable about a rotary center and relaxing torque fluctuation;
a mass ring including:
a first surface facing a first side in an axial direction of the rotary center, the first surface being fixed to the damper;
a second surface facing a second side in the axial direction; and
a first circumferential surface facing an inner side in a radial direction of the rotary center or an outer side in the radial direction;
a drive plate including:
a wall portion including a third surface being in contact with the second surface, the wall portion being fixed to the mass ring; and
a plurality of protruding portions positioned at the first side in the axial direction relative to the third surface and extended from the wall portion along the radial direction, each of the plurality of protruding portions including an end surface configured to fit to the first circumferential surface; and
the drive plate being configured such that the mass ring is concentrically attachable to the drive plate by the fitting of the end surfaces and the first circumferential surface to each other,
wherein the protruding portions are provided in a state where the protruding portions are cut and raised from the wall portion.

2. The flywheel apparatus according to claim 1, wherein the drive plate includes opening portions formed to penetrate the wall portion, and
the protruding portions are provided at edge portions of the opening portions.

3. The flywheel apparatus according to claim 1, wherein the protruding portions each include a curved portion which is curved when seen in a line of sight which is orthogonal to the axial direction.

4. A flywheel apparatus comprising:
a damper being rotatable about a rotary center and relaxing torque fluctuation;
a mass ring including:
a first surface facing a first side in an axial direction of the rotary center, the first surface being connected to the damper;
a second surface facing a second side in the axial direction; and
a first circumferential surface facing an inner side in a radial direction of the rotary center or an outer side in the radial direction;
a drive plate including:
a wall portion including a third surface being in contact with the second surface, the mass ring being fixed to the wall portion via the third surface; and
a plurality of protruding portions positioned at the first side in the axial direction relative to the third surface and extended from the wall portion along the radial direction, each of the plurality of protruding portions including an end surface being in contact with the first circumferential surface; and
the mass ring being concentrically provided at the drive plate by the contact of the end surfaces and the first circumferential surface with each other,
wherein the protruding portions are apart from the wall portion in the axial direction.

5. The flywheel apparatus according to claim 4, wherein the drive plate includes opening portions formed to penetrate the wall portion, and
the protruding portions are provided to extend from edge portions of the opening portions.

6. The flywheel apparatus according to claim 4, wherein the protruding portions each include a curved portion which is curved in a direction which is orthogonal to the axial direction.

* * * * *